United States Patent [19]

Carome

[11] 4,235,113
[45] Nov. 25, 1980

[54] OPTICAL FIBER ACOUSTICAL SENSORS

[76] Inventor: Edward F. Carome, 3850 Merrymound Rd., South Euclid, Ohio 44121

[21] Appl. No.: 935,515

[22] Filed: Aug. 21, 1978

[51] Int. Cl.³ .............................................. G02B 5/14
[52] U.S. Cl. .................................... 73/655; 350/96.29
[58] Field of Search ................. 73/655, 653, 657, 658, 73/649; 350/96.29, 96.13, 96.32; 250/474

[56] References Cited

U.S. PATENT DOCUMENTS

| 2,569,127 | 9/1951 | Eltenton | 350/96.32 |
| 2,972,051 | 2/1961 | Baum | 250/474 |
| 3,442,568 | 5/1969 | Siegmund et al. | 350/96.29 |
| 4,068,191 | 1/1978 | Zemon et al. | 350/96.13 |
| 4,086,484 | 4/1978 | Steensma | 350/96.29 |
| 4,142,774 | 3/1979 | Wright | 350/359 |
| 4,162,397 | 7/1979 | Bucaro et al. | 358/112 |

OTHER PUBLICATIONS

J. A. Bucaro, et al., *Applied Optics,* "Optical Fiber Acoustic Senser," vol. 16, pp. 1761-1762, Jul. 1977.
J. H. Cole, et al., *J. Acous. Soc. Am.,* "Fiber-Optic Detection of Sound," vol. 62, pp. 1136-1138, Nov. 1977.
J. A. Bucaro, et al., *J. Acoust. Soc. Am.,* "Fiber-Optic Hydrophone," vol. 62, pp. 1302-1303, Nov. 1977.
B. Culshaw et al., *Electronics Letters,* "Acoustic Sensitivity of Optical-Fibre Waveguides," vol. 13, pp. 760-761, Dec. 1977.

*Primary Examiner*—Stephen A. Kreitman
*Attorney, Agent, or Firm*—Fay & Sharpe

[57] ABSTRACT

This invention relates to an optical fiber acoustical sensor for sensing acoustic vibrations and in combination with an incoherent or coherent source of light such as a LED or a laser and a photo detector to determine the frequency and amplitude of the sound pressure variations. The invention consists of an element of optical fiber without cladding surrounded by a liquid or plastic potting material permeable to sound pressure and having an index of refraction slightly less than the fiber. The intensity of a light beam transmitted by means of fiber optic waveguides, single or multi-mode, from a source of light through the sensor to a photo detector varies with the variation of sound pressure to which the sensor is subjected. If the sensor is in water, the transmitted light intensity varies with the acoustical pressure in the water because the changes in liquid or plastic index of refraction changes with the sound pressure.

Generally the fiber sensor is in an element preferably surrounded by a fluid which has an index of refraction close to but less than that of the fiber, and the coil thickness is small relative to the wavelength of the sound to be detected.

17 Claims, 3 Drawing Figures

OPTICAL FIBER ACOUSTICAL SENSORS

BACKGROUND OF THE INVENTION

This invention relates to optical fiber acoustical sensors for use in detection and measurement of acoustic pressures. At the present time there are a number of electrical-mechanical microphones and hydrophones, such as piezoelectric, magnetostrictive, and capacitive transducers. These are used to detect and measure sound pressure and produce an electrical signal output. Accurate measurement of sound pressures is a problem as well as system design and impedance matching.

Presently certain fiber optic cabling has been subjected to stress to modulate coherent laser light as in U.S. Pat. No. 3,625,589 to K. Snitzer. This patent considers a number of arrangements for producing detectible phase shifts of coherent optical radiation propagated through optical fibers. In all cases Snitzer considers some type of mechanical transducer is activated by a signal that is to be measured (see Column 4, lines 37–40, "means for producing a signal, and control means responsive to said signal for applying mechanical stress to at least a section of said optical fiber," etc.). It is further noted that this has to be coherent light.

In other developments, a fiber optic communication channel may have its sheathing removed to expose a fiber to an acoustic source so that acoustic energy may be controllably coupled into the fiber optic path changing the refractive index so that there is a scattering of light energy traversing the fiber optic path. A portion of the optical radiation will emerge from the fiber optic path creating a terminal. Additionally, the fiber optic path may be modulated as desired to include signal information impressed from acoustic energy source and detected at the receiving end. An example of the acoustic energy source would be an electrical acoustic transducer.

It is, of course, known that fiber optic acoustic sensor elements consisting of coil optical fibers will be affected by the variations of sound pressure and changes in fiber diameter will result. This causes optical phase shift, Doppler frequency shifts, mode conversions and other changes in the propagation characteristics of the optical beam traveling through the fiber.

Other related developments include U.S. Pat. No. 2,972,051 which is an optical fiber radiation dosimeter. A bibliography of related articles and patents are attached.

SUMMARY OF THE INVENTION

The invention herein discussed relates to an optical fiber acoustic sensor and a combination of components to sense very accurately acoustic vibrations in either air or water.

Basically the invention consists of an optical fiber that may be from 5–100 microns in diameter of one index of refraction which is connected through conventional optical fiber waveguides with a source of coherent light, such as a laser, or incoherent, such as a LED, to a photo detector. Single or multi-mode optical fiber may be used between the light source and the sensor and the photo detector. Surrounding the fiber is an acoustical, permeable potting material, generally plastic of an index of refraction slightly less than the fiber. For example, if the fiber had an index of 1.54, then the potting material would be 1.53.

The sensor may be employed in arrays for directional manipulation to locate a sound source or may be coiled in a sphere for a nondirectional sensor. In this latter event, it resembles an omnidirectional microphone.

DETAILED DESCRIPTION OF THE INVENTION

Most, if not all, low-loss, step index optical fibers consist of a core of optical index $n_1$ surrounded by a cylindrical cladding of index $n_2$, with $n_2$ less than $n_1$. Rays traveling in the core will be partially reflected back into the core and partially transmitted into the cladding. Thus, it continually loses energy as it travels above the core. A ray, if it travels in the core so that it strikes the core cladding interface at an angle $\theta$ greater than the critical angle $\theta_c$, is reflected back totally into the core and thus propagated with very low loss through the core. (See *Spectrum*, Vol. 14, pgs. 33 and 40.)

Work on fiber optic sensors until the present time has been mainly confined to core-plus-cladding type, composite fibers. Effects that have been described in the literature and in patents have been dependent upon changing dimensions, shapes and indices of refraction, etc. with respect to composite type fibers.

This invention takes in consideration a bare core of a uniform index of refraction and places either a straight section or a coil of it in a liquid or a plastic potting material that includes an optical index $n_2$ in close relation to the core index $n_1$. There are great changes in the liquid index produced by the pressure oscillations of the sound waves, and the amount of light propagating in the core changes cyclically at the acoustic frequency. Such an effect, of course, might also be used in the measurement of static pressure changes, temperature changes as well as other parameters.

Figure 1:
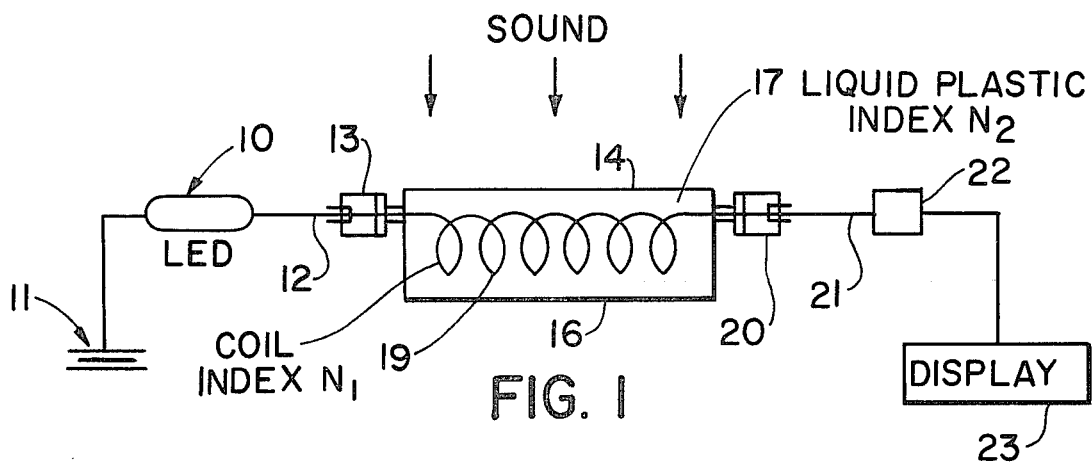
FIG. 1 is a schematic diagram of the present invention.

FIG. 1 is a very good example of the invention wherein 10 is the source of light, such as a LED, that may be incoherent or coherent, fed with a power supply 11 which is connected by means of a single or multi-mode fiber 12 to a connector 13 and to a sensor 14, and surrounded by a protective sound permeable membrane shown at 16. Included within the membrane is a potting material or medium of liquid or plastic as at 17, having an index of refraction $n_2$ slightly less than the index of the bare fiber 19 which is $n_1$. Inside the diaphragm are a multiplicity of turns of fiber, a subset 10–1,000, which are oriented parallel to one another.

In regard to the transducer of this invention, the electromagnetic waves are propagated through a wave conductive medium in a longitudinal direction therethrough, and the medium is encased or clad with a pressure sensitive cladding which for test purposes is a sucrose solution or glycerol and water. The improvement herein consists of the effective index of refraction of the pressure sensitive cladding which varies with respect to the pressures thereon, whereby the intensity of electromagnetic radiation traversing the transducer is varied as a result of variations in pressure.

There is located at the exit another connector 20 and another fiber in the manner of 12 as at 21. The photo detector is shown at 22 with a readout 23.

The core in either a liquid or plastic potting material leads to changes in the index of refraction difference $n_1 - n_2$ when subjected to acoustic pressure.

Figure 2:
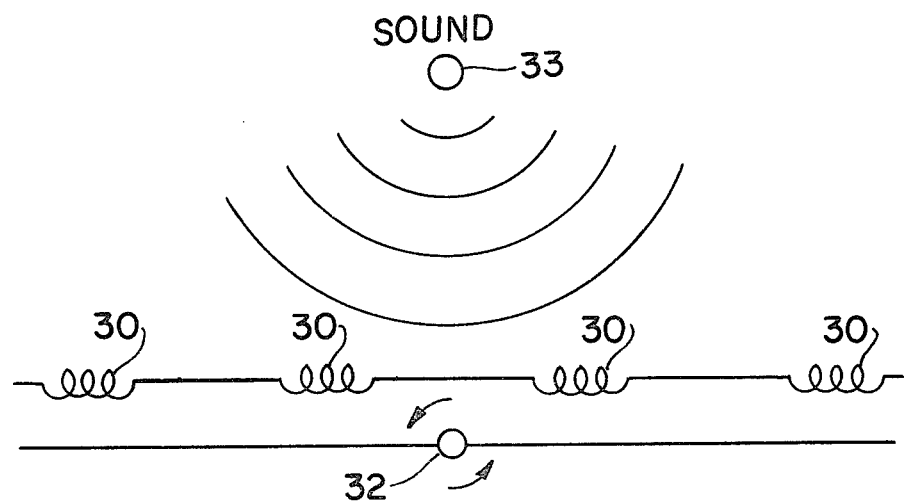
FIG. 2 is a diagram of an acoustical sensor array.

In connection with FIG. 2 a plurality of sensors 30 in an array 31 and pivoted at 32 are illustrated for the purpose of locating an unknown sound source 33.

Figure 3:
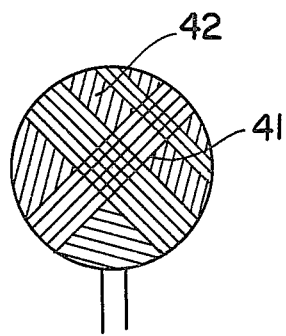
FIG. 3 is an acoustical sensor for non-directional monitoring.

FIG. 3 illustrates one form of sensor having a multiplicity of coils running in a great number of directions much in the manner of a rubber wound golf ball. Thus, this figure is of a nondirectional sensor.

It is a basic physics principle that sound sensing elements are small by comparison with acoustic wavelengths. Accordingly, should the sensing elements be larger than the wavelengths, then the elements are subjected to pressure maxima while still other portions are subjected to pressure minima, and, of course, the effects would cancel one another out. It is well understood that any sound sensor, such as a microphone or a hydrophone, must be of a small size, possibly no greater than one-quarter of a wavelength at the frequency of use; otherwise, there are canceling effects. In this connection we refer to a telephone mouthpiece, a harbor sonar or even a depth finder for use on pleasure boats as examples.

Having thus disclosed the embodiments of the invention, the claims which follow are the true measure of the invention.

BIBLIOGRAPHY

Davis, D. E. N. & Kingsley; "A Novel Optical Fibre Telemetry Highway," *IEEE First European Conference on Optical Fibre Communication,* Sept. 16-18, 1975, pp. 165-7, Proceedings Kingsley, S. A. "Optical—Fibre Phase Modulator," *Electronic Letters,* Vol. 11, pp. 166-68, Aug. 8, 1975.

Jacobs, Ira & Miller, Stewart E.; "Optical Transmission of Voice and Data," *Spectrum,* Vol. 14, pp. 33-41.

Giallorenzi, Thomas G.; "Optical Communications Research and Technology: Fiberoptics;" *Proceedings of the IEEE,* Vol. 66, No. 7, July, 1978, pp. 744-780.

Segal, G. H.; "New Real-Time Dosimeters Use Fiber Optics," *Naval Research Laboratory* [NRL], *R & D Highlights,* Washington, D.C., Vol. No. 1, pp. 7-8, Dec. 1974.

Glossary of Fiber-Optic Basic Definitions; *Spectrum,* Vol. 14, pp. 33-5.

REFERENCE PATENTS

U.S. Pat. No. 3,625,589—Snitzer; Oct. 7, 1971
U.S. Pat. No. 2,972,051—Baum; Feb. 14, 1961
U.S. Pat. No. 3,837,727—Norton; Sept. 24, 1974
U.S. Pat. No. 3,920,982—Harris; Nov. 18, 1975
U.S. Pat. No. 4,068,191—Zemon et al; Jan. 10, 1978

FIBER-OPTIC BASIC DEFINITIONS

ABSORPTION LOSSES—Losses caused by impurities in the transmission medium as well as intrinsic material absorption.

ACCEPTANCE ANGLE—Any angle measured from the longitudinal center line up to the maximum acceptance angle of an incident ray that will be accepted for transmission along a fiber. The maximum acceptance angle is dependent on the indices of refraction of the two media that determine the critical angle.

ACCEPTANCE CONE—A cone whose included angle is equal to twice the acceptance angle.

CLADDING—A sheathing or covering, usually of glass, fused to the core of an optical fiber.

CORE—The center dielectric in an optical fiber whose index of refraction is greater than that of its surrounding medium, usually a cladding. (See "optical fiber.")

CRITICAL ANGLE—The smallest angle made by a meridional ray in an optical fiber that can be totally reflected from the innermost interface and thus determines the maximum acceptance angle at which a meridional ray can be accepted for transmission along a fiber.

DATA BUS—An optical waveguide used as a common trunk line to which a number of terminals can be interconnected through optical couplers.

DATA BUS COUPLER—An optical component that interconnects a number of optical waveguides and provides an inherently bi-directional system by mixing and splitting all signals within the component.

FIBER BUNDLE—A group of parallel fibers within a jacket—usually polyvinyl chloride (PVC). The number of fibers might range from a few to several hundred, depending on the application and the characteristics of the fiber.

FIBER-OPTICE CABLE—Optical fibers incorporated into an assembly of materials that provides tensile strength, external protection, and handling properties comparable to those of equivalent diameter coaxial cables.

FIBER OPTICS—The technique of conveying light or images through a particular configuration of glass or plastic fibers. Incoherent fiber optics will transmit light—but not an image. Coherent fiber optics can transmit an image through the perfectly aligned, small clad optical fibers. Specialty fiber optics combine coherent and incoherent aspects.

FRESNEL REFLECTION LOSSES—Reflection losses that are incurred at the input and output of optical fiber and are due to the difference in refractive index between the core glass and the immersion medium.

GRADED-INDEX FIBER—An optical fiber with a refractive index that gets progressively lower away from the axis. This characteristic causes the light rays to be continually refocused by refraction in the core.

INDEX OF REFRACTION—The ratio of the velocity of light in vacuum to the velocity of light in a given medium.

LIGHT CONDUIT—A flexible, incoherent bundle of fibers used to transmit light.

LIGHT GUIDE—An assembly of a number of optical fibers mounted and finished in a component that is used solely to transmit light flux, as distinguished from an optical waveguide's function.

LIGHT-LEAKAGE LOSSES—Losses due to imperfections at the core/cladding boundary.

MERIDIONAL RAY—A ray that passes through the axis of a fiber while being internally reflected (in contrast with a skew ray) and is confined to a single plane.

MULTI-MODE FIBERS—Optical fibers that have a much larger core than single-mode fiber cores and which permit non-axial rays of modes to propagate through the core compared with only one mode through a single-mode fiber.

NONCOHERENT BUNDLE—A group of optical fibers positioned essentially parallel to each other in a bundle that is used simply as a means of guiding beams of light. (Also known as a light conduit.)

NUMERICAL APERTURE—A number that expresses the light-gathering power of a fiber, mathematically equal to the sine of the acceptance angle. The numerical aperture (NA) of an optical fiber defines a characteristics of the fiber in terms of its acceptance of impinging light. The "degree of openness, light-gathering ability, and acceptance cone" are all terms describing this characteristic.

OPTICAL FIBER—Basically a light-guidance system (dielectric waveguide) that is cylindrical in shape. It consists of either a cylinder of transparent dielectric material of refractive index $n_1$ whose walls are in contact with a second dielectric material of a lower refractive index $n_2$, or of a cylinder whose core has a refractive index that gets progressively lower away from the center. The fiber relies upon internal reflection to transmit light along its axial length. Light enters one end of the fiber and emerges from the opposite end with only minimal loss. Other terms describing this effect are "optical waveguide, light guide, light conduit," etc.

PULSE DISPERSION—Sometimes called pulse spreading. A separation of spreading of input optical signals along the length of the optical fiber. This limits the useful transmission bandwidth of the fiber. It's expressed in time and distance as mamoseconds per kilometer. Three basic mechanisms for dispersion are: the material effect, the waveguide effect, and the multi-mode effect.

REFRACTIVE INDEX—See "Index of Refraction."

REFLECTANCE LOSSES—See "Fresnel Reflection."

SCATTERING LOSSES—Losses in optical fibers caused by unhomogeneities (dissimilar qualities), such as undissolved particles, boundary roughness, and intrinsic material scattering.

SINGLE FIBER—A filament of optical material, glass or plastic, usually drawn with a lower index cladding. (See "Optical Fiber.")

SINGLE-MODE FIBER—A low-loss optical waveguide with a very small core. It requires a laser source for the input signals because of the very small entrance aperture (acceptance cone). The small core radius approaches the wavelength of the source; consequently, only a single mode is propagated.

SKEW RAY—A ray that never intersects the axis of a fiber while being internally reflected (in contrast with a meridional ray).

STEP-INDEX FIBER—An optical fiber that has an abrupt change in refractive index due to a core and cladding that have different indices of refraction.

TEE COUPLER—An optical component used to interconnect a number of terminals through optical waveguides by using partial reflections at dielectric interfaces or metallic surfaces, or by splitting the optical waveguide bundle.

What is claimed is:

1. A pressure to electromagnetic radiation transducer comprising:
    an elongated electromagnetic wave conductive medium of a predetermined normal first index of refraction and adapted to receive electromagnetic waves and conduct them longitudinally therethrough; and
    a pressure sensitive cladding encasing said elongated electromagnetic wave conductive medium and having a smooth continuous surface, said cladding having a predetermined normal second index of refraction which is slightly lower than said first index of refraction of said wave conductive medium, the index of refraction of said cladding varying with respect to the pressure thereon;
    said electromagnetic wave conductive medium and said cladding being such that the difference between their respective refractive indices varies uniformly along the length of said electromagnetic wave conductive medium and said cladding with pressure applied to said cladding thereby uniformly controlling the intensity and/or phase of electromagnetic radiation traversing said electromagnetic wave conductive medium.

2. The pressure to electromagnetic radiation transducer of claim 1 wherein the pressure is acoustic pressure.

3. The pressure to electromagnetic radiation transducer of claim 1 wherein the electromagnetic radiation has a wavelength in the optic range.

4. The pressure to electromagnetic radiation transducer of claim 1 wherein the wave conductive medium is glass.

5. The pressure to electromagnetic radiation transducer of claim 1 wherein the cladding is fluid.

6. The pressure to electromagnetic radiation transducer of claim 1 wherein the cladding is fluid encased in a thin membrane.

7. An acoustical sensor comprising in combination:
    an element of glass fiber having a predetermined normal first index of refraction and adapted to receive electromagnetic waves and conduct them therethrough, said element of glass fiber having a thickness that is small relative to the wavelength of the sound waves to be detected; and
    an acoustic pressure sensitive potting material encasing said element of glass fiber and having a smooth continuous surface, said potting material having a predetermined normal second index of refraction which is slightly lower than said first index of refraction of said element of glass fiber, the index of refraction of said potting material varying with respect to the acoustic pressure applied thereon;
    said element of glass fiber and said potting material being such that the difference between their respective refractive indices varies uniformly throughout said glass fiber and said potting material with acoustic pressure applied to said potting material thereby uniformly controlling the intensity and/or phase of electromagnetic radiation traversing said element of glass fiber.

8. The sensor of claim 7 wherein the potting material is encased in a thin film, permeable to acoustic pressure.

9. The sensor of claim 7 wherein the potting material is plastic.

10. The sensor of claim 7 wherein the element is a coil.

11. The sensor of claim 7 wherein the potting material is a liquid encased in a thin film.

12. An acoustic sensor comprising in combination:
    a source of light;
    a photodetector for said light;
    a single or multi-mode optical fiber extending between said source of light and said photodetector and having a predetermined normal first index of refraction; said optical fiber being adapted to receive light from said source and conduct said light therethrough to said photodetector; and an acoustic pressure sensitive potting material encasing at least a portion of the length of said optical fiber and having a smooth continuous surface, said potting material having a predetermined normal second index of refraction which is slightly lower than said first index of refraction of said optical fiber, the index of refraction of said potting material varying with respect to the acoustic pressure applied thereon;

said optical fiber and said potting material being such that the difference between their respective refractive indices varies uniformly throughout said optical fiber and said potting material with acoustic pressure applied to said potting material thereby uniformly controlling the intensity and/or phase of the light traversing said optical fiber.

13. The combination of claim 12 wherein the material is encased in a thin film permeable to acoustical vibrations.

14. The combination of claim 12 wherein a multiplicity of sensors are utilized and oriented with respect to one another enabling the source and direction of acoustical vibrations to be detected.

15. The combination of claim 12 wherein a multiplicity of turns of the fiber are wrapped in a generally spherical manner to provide a nondirectional acoustical sensor.

16. The combination of claim 12 wherein the sensor combination is exposed to atmosphere.

17. The combination of claim 12 wherein the sensor is made liquid tight and exposed to vibrations in water.

* * * * *